United States Patent
McAnally et al.

(10) Patent No.: US 11,879,760 B2
(45) Date of Patent: Jan. 23, 2024

(54) DETERMINING A DECAY CHARACTERISTIC OF A METER ASSEMBLY

(71) Applicant: MICRO MOTION, INC., Boulder, CO (US)

(72) Inventors: Craig B. McAnally, Thornton, CO (US); Bert J. Downing, Longmont, CO (US)

(73) Assignee: MICRO MOTION, INC., Boulder, CO (US)

(*) Notice: Subject to any disclaimer, the term of this patent is extended or adjusted under 35 U.S.C. 154(b) by 380 days.

(21) Appl. No.: 17/265,291

(22) PCT Filed: Aug. 13, 2018

(86) PCT No.: PCT/US2018/046519
§ 371 (c)(1),
(2) Date: Feb. 2, 2021

(87) PCT Pub. No.: WO2020/036581
PCT Pub. Date: Feb. 20, 2020

(65) Prior Publication Data
US 2021/0302212 A1    Sep. 30, 2021

(51) Int. Cl.
*G06F 11/30* (2006.01)
*G01F 1/84* (2006.01)
*G01H 11/00* (2006.01)
*G01M 99/00* (2011.01)

(52) U.S. Cl.
CPC ........... *G01F 1/8436* (2013.01); *G01H 11/00* (2013.01); *G01M 99/005* (2013.01)

(58) Field of Classification Search
CPC .................................................... G01F 1/8436
See application file for complete search history.

(56) References Cited

U.S. PATENT DOCUMENTS

| | | |
|---|---|---|
| 9,234,780 B2 | 1/2016 | Henry et al. |
| 2008/0184813 A1 | 8/2008 | Patten et al. |
| 2011/0178738 A1 | 7/2011 | Rensing et al. |
| 2011/0277559 A1 | 11/2011 | Miyaji et al. |
| 2013/0160565 A1* | 6/2013 | Scherrer ............ G01F 1/66 73/861.355 |

FOREIGN PATENT DOCUMENTS

WO    WO-2017123214 A1 *  7/2017  ............... G01F 1/74

* cited by examiner

*Primary Examiner* — Phuong Huynh
(74) *Attorney, Agent, or Firm* — The Ollila Law Group LLC (57) ABSTRACT

A meter electronics (20) for determining a decay characteristic of a meter assembly (10) of a flow meter (5) is provided. The meter electronics (20) includes an interface (201) for receiving a vibrational response from a meter assembly (10), the vibrational response comprising a response to an excitation of the meter assembly (10) at a substantially resonant frequency, and a processing system (203) in communication with the interface (201). The processing system (203) is configured to receive the vibrational response from the interface (201), determine a response voltage (V) of the vibrational response, determine a decay characteristic ($\zeta$) of the meter assembly (10) based on the response voltage (V), and compensate the decay characteristic ($\zeta$) by using a previously determined decay characteristic-to-response voltage relationship.

18 Claims, 8 Drawing Sheets

DETERMINING A DECAY CHARACTERISTIC OF A METER ASSEMBLY

TECHNICAL FIELD

The present invention relates generally to meter verification and, more particularly, to determining a decay characteristic of a meter assembly.

BACKGROUND

Vibrating conduit sensors, such as Coriolis mass flow meters or vibrating tube densitometers, typically operate by detecting motion of a vibrating conduit that contains a flowing material. Properties associated with the material in the conduit, such as mass flow, density and the like, can be determined by processing measurement signals received from motion transducers associated with the conduit. The vibration modes of the vibrating material-filled system generally are affected by the combined mass, stiffness, and damping characteristics of the containing conduit and the material contained therein.

A conduit of a vibratory flow meter can include one or more flow tubes. A flow tube is forced to vibrate at a resonant frequency, where the resonant frequency of the tube is proportional to the density of the fluid in the flow tube. Sensors located on the inlet and outlet sections of the tube measure the relative vibration between the ends of the tube. During flow, the vibrating tube and the flowing mass couple together due to Coriolis forces, causing a phase shift in the vibration between the ends of the tube. The phase shift is directly proportional to the mass flow.

A typical Coriolis mass flow meter includes one or more conduits that are connected inline in a pipeline or other transport system and convey material, e.g., fluids, slurries and the like, in the system. Each conduit may be viewed as having a set of natural vibration modes including, for example, simple bending, torsional, radial, and coupled modes. In a typical Coriolis mass flow measurement application, a conduit is excited in one or more vibration modes as a material flows through the conduit, and motion of the conduit is measured at points spaced along the conduit. Excitation is typically provided by an actuator, e.g., an electromechanical device, such as a voice coil-type driver, that perturbs the conduit in a periodic fashion. Mass flow rate may be determined by measuring time delay or phase differences between motions at the transducer locations. Two such transducers (or pickoff sensors) are typically employed in order to measure a vibrational response of the flow conduit or conduits, and are typically located at positions upstream and downstream of the actuator. The two pickoff sensors are connected to electronic instrumentation by cabling. The instrumentation receives signals from the two pickoff sensors and processes the signals in order to derive a mass flow rate measurement.

The phase difference between the two sensor signals is related to the mass flow rate of the material flowing through the flow tube or flow tubes. The mass flow rate of the material is proportional to the time delay between the two sensor signals, and the mass flow rate can therefore be determined by multiplying the time delay by a flow calibration factor (FCF), where the time delay comprises a phase difference divided by frequency. The FCF reflects the material properties and cross-sectional properties of the flow tube. In the prior art, the FCF is determined by a calibration process prior to installation of the flow meter into a pipeline or other conduit. In the calibration process, a fluid is passed through the flow tube at a given flow rate and the proportion between the phase difference and the flow rate is calculated.

One advantage of a Coriolis flow meter is that the accuracy of the measured mass flow rate is not affected by wear of moving components in the flow meter. The flow rate is determined by multiplying the phase difference between two points of the flow tube and the flow calibration factor. The only input is the sinusoidal signals from the sensors, indicating the oscillation of two points on the flow tube. The phase difference is calculated from these sinusoidal signals. There are no moving components in the vibrating flow tube. Therefore, the measurement of the phase difference and the flow calibration factor are not affected by wear of moving components in the flow meter.

The FCF can be related to a stiffness, damping, and mass attributes of the meter assembly. If the attributes of the meter assembly change, then the FCF may also change. Changes in the attributes will therefore affect the accuracy of the flow measurements generated by the flow meter. Changes in the attributes may be due to changes in the material and cross-sectional properties of a flow tube, which can be caused by erosion or corrosion, for example. Consequently, it is highly desirable to be able to detect and/or quantify any changes to the attributes, such as the damping attribute, of the meter assembly in order to maintain a high level of accuracy in the flow meter.

The damping attribute is related to and can be determined from a decay characteristic. The decay characteristic can be determined by measuring an amplitude of a vibration as the vibration decays. However, the decay characteristic can vary due to properties that are not of the meter assembly or that vary; such as a density or viscosity of the material being measured or temperature of the meter assembly. Accordingly, there is a need for determining a decay characteristic of the meter assembly that is minimally affected by such issues.

SUMMARY

A meter electronics for determining a decay characteristic of a meter assembly of a flow meter is provided. The meter electronics comprises an interface for receiving a vibrational response from a meter assembly, the vibrational response comprising a response to an excitation of the meter assembly at a substantially resonant frequency, and a processing system in communication with the interface. The processing system is configured to receive the vibrational response from the interface, determine a response voltage of the vibrational response, determine a decay characteristic of the meter assembly based on the response voltage, and compensate the decay characteristic by using a previously determined decay characteristic-to-response voltage relationship.

A method for determining a decay characteristic of a meter assembly of a flow meter is provided. The method comprises receiving a vibrational response from the meter assembly, the vibrational response comprising a response to an excitation of the meter assembly at a substantially resonant frequency. The method further comprises receiving the vibrational response, determining a response voltage of the vibrational response, determining a decay characteristic of the meter assembly based on the response voltage, and compensating the decay characteristic by using a previously determined decay characteristic-to-response voltage relationship.

A method of determining a decay characteristic of a meter assembly of a flow meter is provided. The method comprises receiving a vibrational response from the meter assembly, the vibrational response comprising a response to an excitation of the meter assembly at a substantially resonant frequency. The method further comprises receiving the vibrational response from the interface, allowing the vibrational response to decay from a start response voltage to a stop response voltage, measuring the response voltage from a start response voltage threshold to a stop response voltage threshold, and determining one or more fractional decay characteristics of the meter assembly based on the start response voltage threshold and the stop response voltage threshold. At least one of the start response voltage threshold and the stop response voltage threshold is between the start response voltage and the stop response voltage.

Aspects

According to an aspect, a meter electronics (20) for determining a decay characteristic of a meter assembly (10) of a flow meter (5) comprises an interface (201) for receiving a vibrational response from a meter assembly (10), the vibrational response comprising a response to an excitation of the meter assembly (10) at a substantially resonant frequency, and a processing system (203) in communication with the interface (201). The processing system (203) is configured to receive the vibrational response from the interface (201), determine a response voltage (V) of the vibrational response, determine a decay characteristic ($\zeta$) of the meter assembly (10) based on the response voltage (V), and compensate the decay characteristic ($\zeta$) by using a previously determined decay characteristic-to-response voltage relationship.

Preferably, the previously determined decay characteristic-to-response voltage relationship includes one of a start response voltage and a stop response voltage used to determine the decay characteristic ($\zeta$).

Preferably, the previously determined decay characteristic-to-response voltage relationship relates a previously determined decay characteristic with one of a start response voltage and a stop response voltage.

Preferably, the previously determined decay characteristics-to-response voltage relationship is an error-to-response voltage function.

Preferably, determining the decay characteristic ($\zeta$) further comprises allowing the response voltage (V) of the vibrational response of the meter assembly (10) to decay down to a predetermined stop response voltage.

Preferably, the processing system (203) being further configured to determine the decay characteristic ($\zeta$) by removing the excitation of the meter assembly (10) and allowing the response voltage (V) of the vibrational response of the meter assembly (10) to decay down to a predetermined stop response voltage.

According to an aspect, a method for determining a decay characteristic of a meter assembly of a flow meter comprises receiving a vibrational response from the meter assembly, the vibrational response comprising a response to an excitation of the meter assembly at a substantially resonant frequency. The method further comprises receiving the vibrational response, determining a response voltage of the vibrational response, determining a decay characteristic of the meter assembly based on the response voltage, and compensating the decay characteristic by using a previously determined decay characteristic-to-response voltage relationship.

Preferably, the previously determined decay characteristic-to-response voltage relationship includes one of a start response voltage and a stop response voltage used to determine the decay characteristic.

Preferably, the previously determined decay characteristic-to-response voltage relationship relates a previously determined decay characteristic with one of start response voltage and stop response voltage.

Preferably, the previously determined decay characteristics-to-response voltage relationship is an error-to-response voltage function.

Preferably, determining the decay characteristic further comprises allowing the response voltage of the vibrational response of the meter assembly to decay down to a predetermined stop response voltage.

Preferably, the decay characteristic is determined by removing the excitation of the meter assembly and allowing the response voltage of the vibrational response of the meter assembly to decay down to a predetermined stop response voltage.

According to an aspect, a method of determining a decay characteristic of a meter assembly of a flow meter comprises receiving a vibrational response from the meter assembly, the vibrational response comprising a response to an excitation of the meter assembly at a substantially resonant frequency. The method further comprises receiving the vibrational response from the interface, allowing the vibrational response to decay from a start response voltage to a stop response voltage, measuring the response voltage from a start response voltage threshold to a stop response voltage threshold, and determining one or more fractional decay characteristics of the meter assembly based on the start response voltage threshold and the stop response voltage threshold, wherein at least one of the start response voltage threshold and the stop response voltage threshold is between the start response voltage and the stop response voltage.

Preferably, the start response voltage is a response voltage of the response to the vibration of the meter assembly at the substantially resonant frequency and the stop response voltage is proximate zero volts.

Preferably, one of the start response voltage threshold is proximate the start response voltage and the stop response voltage threshold is proximate the stop response voltage.

Preferably, determining the one or more fractional decay characteristics of the meter assembly based on the start response voltage threshold and the stop response voltage threshold, wherein at least one of the start response voltage threshold and the stop response voltage threshold is between the start response voltage and the stop response voltage comprises one of determining one or more fractional decay characteristics of the meter assembly based on one or more stop response voltage thresholds relative to a start response voltage threshold, and determining the one or more fractional decay characteristics of the meter assembly based on one or more start response voltage thresholds relative to a stop response voltage threshold.

Preferably, the method further comprises determining a decay characteristic-to-response voltage relationship for compensating a decay characteristic that is based on the start response voltage threshold and the stop response voltage threshold.

Preferably, the start response voltage threshold is determined based on the start response voltage.

BRIEF DESCRIPTION OF THE DRAWINGS

The same reference number represents the same element on all drawings. It should be understood that the drawings are not necessarily to scale.

DETAILED DESCRIPTION

FIGS. 1-8 and the following description depict specific examples to teach those skilled in the art how to make and use the best mode of determining a decay characteristic of a meter assembly. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, determining the decay characteristic of the meter assembly is not limited to the specific examples described below, but only by the claims and their equivalents.

Figure 1:
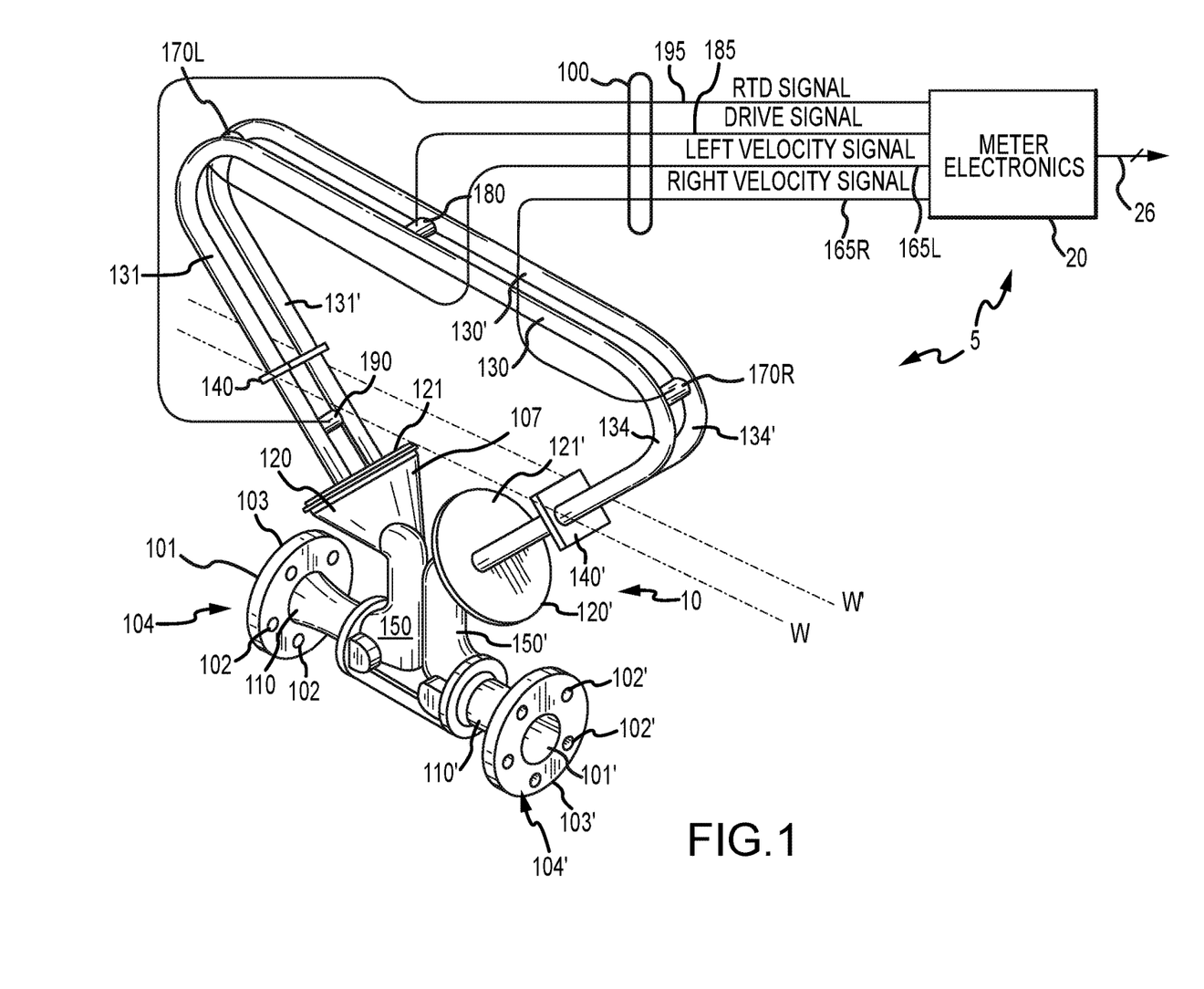
FIG. 1 shows a flow meter comprising a meter assembly and meter electronics.

FIG. 1 shows a flow meter 5 comprising a meter assembly 10 and meter electronics 20. Meter assembly 10 responds to mass flow rate and density of a process material. Meter electronics 20 is connected to meter assembly 10 via leads 100 to provide density, mass flow rate, and temperature information over path 26, as well as other information not relevant to the present invention. A Coriolis flow meter structure is described although it is apparent to those skilled in the art that the present invention could be practiced as a vibrating tube densitometer without the additional measurement capability provided by a Coriolis mass flow meter.

Meter assembly 10 includes a pair of manifolds 150 and 150', flanges 103 and 103' having flange necks 110 and 110', a pair of parallel flow tubes 130 and 130', drive mechanism 180, temperature sensor 190, and a pair of pickoff sensors 170L and 170R. Flow tubes 130 and 130' have two essentially straight inlet legs 131 and 131' and outlet legs 134 and 134' which converge towards each other at flow tube mounting blocks 120 and 120'. Flow tubes 130 and 130' bend at two symmetrical locations along their length and are essentially parallel throughout their length. Brace bars 140 and 140' serve to define the axis W and W' about which each flow tube oscillates.

The side legs 131, 131' and 134, 134' of flow tubes 130 and 130' are fixedly attached to flow tube mounting blocks 120 and 120' and these blocks, in turn, are fixedly attached to manifolds 150 and 150'. This provides a continuous closed material path through Coriolis meter assembly 10.

When flanges 103 and 103', having holes 102 and 102' are connected, via inlet end 104 and outlet end 104' into a process line (not shown) which carries the process material that is being measured, material enters end 104 of the meter through an orifice 101 in flange 103 is conducted through manifold 150 to flow tube mounting block 120 having a surface 121. Within manifold 150 the material is divided and routed through flow tubes 130 and 130'. Upon exiting flow tubes 130 and 130', the process material is recombined in a single stream within manifold 150' and is thereafter routed to exit end 104' connected by flange 103' having bolt holes 102' to the process line (not shown).

Flow tubes 130 and 130' are selected and appropriately mounted to the flow tube mounting blocks 120 and 120' so as to have substantially the same mass distribution, moments of inertia and Young's modulus about bending axes W-W and W'-W', respectively. These bending axes go through brace bars 140 and 140'. Inasmuch as the Young's modulus of the flow tubes change with temperature, and this change affects the calculation of flow and density, resistive temperature detector (RTD) 190 is mounted to flow tube 130', to continuously measure the temperature of the flow tube. The temperature of the flow tube and hence the voltage appearing across the RTD for a given current passing therethrough is governed by the temperature of the material passing through the flow tube. The temperature dependent voltage appearing across the RTD is used in a well known method by meter electronics 20 to compensate for the change in elastic modulus of flow tubes 130 and 130' due to any changes in flow tube temperature. The RTD is connected to meter electronics 20 by lead 195.

Both flow tubes 130 and 130' are driven by driver 180 in opposite directions about their respective bending axes W and W' and at what is termed the first out-of-phase bending mode of the flow meter. This drive mechanism 180 may comprise any one of various arrangements, such as a magnet mounted to flow tube 130' and an opposing coil mounted to flow tube 130 and through which an alternating current is passed for vibrating both flow tubes. A suitable drive signal is applied by meter electronics 20, via lead 185, to drive mechanism 180.

Meter electronics 20 receives the RTD temperature signal on lead 195, and the left and right pickoff signals appearing on leads 165L and 165R, respectively. Meter electronics 20 produces the drive signal appearing on lead 185 to drive element 180 and vibrate tubes 130 and 130'. Meter electronics 20 processes the left and right pickoff signals and the RTD signal to compute the mass flow rate and the density of the material passing through meter assembly 10. This information, along with other information, is applied by meter electronics 20 over path 26.

As previously discussed, the flow calibration factor (FCF) reflects the material properties and cross-sectional properties of the flow tube. A mass flow rate of flow material flowing through the flow meter is determined by multiplying a measured time delay (or phase difference/frequency) by the FCF. The FCF can be related to stiffness, damping, and mass characteristics of the meter assembly. If the characteristics of the meter assembly change, then the FCF will also change. Changes in the characteristics of the meter assembly therefore will affect the accuracy of the flow measurements generated by the flow meter.

A vibrational response of a flow meter can be represented by an open loop, second order drive model, comprising:

$$M\ddot{x}+C\dot{x}+Kx=f \qquad (1)$$

where f is the force applied to the system, M is a mass of the system, C is a damping characteristic, and K is a stiffness characteristic of the system. The term K comprises $K=M(\omega_0)^2$ and the term C comprises $C=M2\zeta\omega_0$, where $\zeta$ comprises a decay characteristic, and $\omega_0=2\pi f_0$ where $f_0$ is the natural/resonant frequency of the meter assembly 10 in Hertz. In addition, x is the physical displacement distance of the vibration, $\dot{x}$ is the velocity of the flowtube displacement, and $\ddot{x}$ is the acceleration. This is commonly referred to as the MCK model. This formula can be rearranged into the form:

$$M[S^2+2\zeta\omega_0 S+\omega_0^2]x=f \qquad (2)$$

Equation (2) can be further manipulated into a transfer function form. In the transfer function form, a term of displacement over force is used, comprising:

$$\frac{x}{f} = \frac{s}{M[s^2 + 2\zeta\omega_0 s + \omega_0^2]} \qquad (3)$$

Well-known magnetic equations can be used to simplify equation (3). Two applicable equations are:

$$V_{EMF}=BL_{PO}*\dot{x} \qquad (4)$$

and $$f=BL_{DR}*I \qquad (5)$$

The sensor voltage $V_{EMF}$ of equation (4) (at a pick-off sensor 170L or 170R) is equal to the pick-off sensitivity factor $BL_{PO}$ multiplied by the pick-off velocity of motion $\dot{x}$. The pick-off sensitivity factor $BL_{PO}$ is generally known or measured for each pick-off sensor. The force (f) generated by the driver 180 of equation (5) is equal to the driver sensitivity factor $BL_{DR}$ multiplied by the drive current (I) supplied to the driver 180. The driver sensitivity factor $BL_{DR}$ of the driver 180 is generally known or measured. The factors $BL_{PO}$ and $BL_{DR}$ are both a function of temperature, and can be corrected by a temperature measurement.

By substituting the magnetic equations (4) and (5) into the transfer function of equation (3), the result is:

$$\frac{V}{I} = \frac{BL_{PO}*BL_{DR}*s}{M[s^2 + 2\zeta\omega_0 s + \omega_0^2]} \qquad (6)$$

If the meter assembly 10 is driven open loop on resonance, i.e., at a resonant/natural frequency $\omega_0$ (where $\omega_0=2\pi f_0$), then equation (6) can be rewritten as:

$$\left(\frac{V}{I}\right)_{\omega_0} = \frac{BL_{PO}*BL_{DR}*\omega_0}{2\zeta M\omega_0^2} \qquad (7)$$

By substituting for stiffness, equation (7) is simplified to:

$$\left(\frac{V}{I}\right)_{\omega_0} = \frac{BL_{PO}*BL_{DR}*\omega_0}{2\zeta K} \qquad (8)$$

Here, the stiffness parameter K can be isolated in order to obtain:

$$K = \frac{I*BL_{PO}*BL_{DR}*\omega_0}{2\zeta V} \qquad (9)$$

As a consequence, by measuring/quantifying the decay characteristic $\zeta$, along with the drive voltage V and drive current I, the stiffness parameter K can be determined. The response voltage V from the pick-offs can be determined from the vibrational response, along with the drive current I. The process of determining the stiffness parameter K is discussed in more detail in conjunction with FIG. 3, below.

In use, the stiffness parameter K can be tracked over time. For example, statistical techniques can be used to determine any changes over time (i.e., a stiffness change $\Delta K$). A statistical change in the stiffness parameter K can indicate that the FCF for the particular flow meter has changed. As can be observed from equation (9), the stiffness parameter may be determined based on the decay characteristic $\zeta$.

A proportionally damped system may decay exponentially as a function of time t as given by equation (10):

$$\eta(t)=Ae^{-\zeta\omega_n t}, \qquad (10)$$

where $\eta$ is the time decaying modal magnitude, A is the initial amplitude, $\zeta$ is the decay characteristic (sometimes referred to as proportional damping coefficient, etc.), and $\omega_n$ is the natural frequency.

A modal magnitude can be thought of as an average of the right and left pickoffs. The averaging process may amplify a drive mode (also referred to as a first out-of-phase bend mode) and attenuates the other modes (e.g., twist modes, second order or higher bend modes, etc.). Since damping is a global modal property, using the modal magnitude may be advantageous over, for example, using either the right or left pickoff to estimate damping.

To determine the decay characteristic $\zeta$, equation (10) may be linearized in time by taking the natural logarithm of both sides:

$$\ln(\eta)=(-\zeta\omega_n)t+\ln(A). \qquad (11)$$

Equation (11) is linear in time with slope $-\zeta\omega_n$ and intercept $\ln(A)$. Equation (11) can be solved in a straightforward least squares manner by taking n samples of the modal magnitude $\eta$ at the corresponding times t.

$$\begin{Bmatrix} \ln(\eta(t_1)) \\ \vdots \\ \ln(\eta(t_n)) \end{Bmatrix} = \begin{bmatrix} t_1 & 1 \\ \vdots & \vdots \\ t_n & 1 \end{bmatrix} \begin{Bmatrix} -\zeta\omega_n \\ \ln(A) \end{Bmatrix}. \qquad (12)$$

Equation (12) is solved by premultiplying the vector containing the log of the modal responses by the pseudo inverse of the basis vectors consisting of the sample times $t_1 \ldots t_n$ augmented by a vector of ones. The result is a least squares estimate quantities of interest, damping and the intercept.

$$\begin{Bmatrix} -\zeta\omega_n \\ \ln(A) \end{Bmatrix} = \begin{bmatrix} t_1 & 1 \\ \vdots & \vdots \\ t_n & 1 \end{bmatrix}^{-1} \begin{Bmatrix} \ln(\eta(t_1)) \\ \vdots \\ \ln(\eta(t_n)) \end{Bmatrix}$$

A gain decay meter verification method may rely on an accurate curve fit of the decaying pickoff voltage to determine the decay characteristic $\zeta$. The calculation for the decay characteristic $\zeta$ may be performed by cutting drive current, thereby removing an excitation of the meter assembly 10, and measuring the pickoff voltage as a vibrational response decays naturally from a start response voltage to a stop response voltage. The start response voltage may be based on an amplitude of the vibration when vibrating at the resonant frequency. The stop response voltage may be at or about zero volts, although any suitable amplitude or unit may be employed.

Sampling for the pickoff voltage to determine a decay curve may begin when the pickoff voltage goes below a start response voltage threshold and stops when it reaches a stop response voltage threshold. An exponential least squares curve fit may then be applied to the curve to determine an exponential function that best describes the data, although any suitable data fitting, format, or form of data may be employed. Accordingly, the decay characteristic may be measured from the start response voltage threshold, which may be less than the start response voltage, to the stop response voltage threshold, which may be greater than the stop response voltage.

The start response voltage threshold and stop response voltage threshold are a function of the vibratory meter (e.g., geometry, size, configuration, etc.), the drive target at which the vibratory meter is operating, a material density and viscosity, and temperature. However, nonlinearities in the meter electronics 20 and/or the meter assembly 10 can result in different decay characteristic $\zeta$ values when the start and/or stop response voltage thresholds for pickoff voltages sampled during the decay are changed. These nonlinearities can result in a change in stiffness when no mechanical change in the meter assembly 10 has occurred.

The meter electronics 20, as well as other meter electronics, can employ methods, such as those described below, to compensate a decay characteristic $\zeta$ to more accurately reflect a change in the meter assembly 10. For example, the decay characteristics $\zeta$ may be correlated with various start and stop response voltage threshold values. Accordingly, an error curve may be generated by correlating the various start and stop response voltages to error values determined by, for example, comparing decay characteristic $\zeta$ values to a nominal decay characteristic value. Subsequently, raw decay characteristic $\zeta$ values (e.g., those determined during a meter verification routine) may be compensated by using the error curve, as will be explained in more detail in the following.

Figure 2:
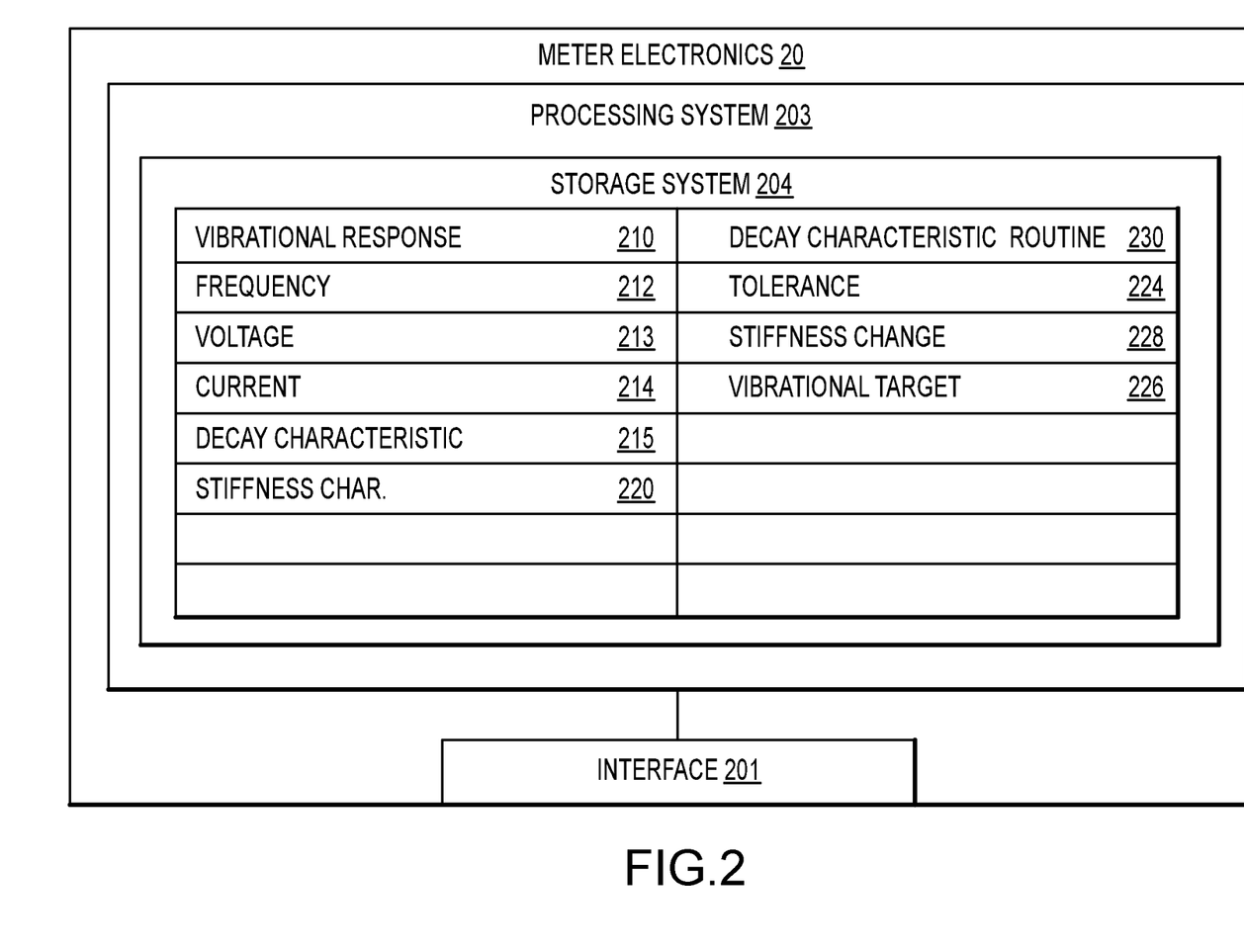
FIG. 2 shows the meter electronics 20 for determining a decay characteristic of a meter assembly.

FIG. 2 shows the meter electronics 20 for determining a decay characteristic of a meter assembly. The meter electronics 20 can include an interface 201 and a processing system 203. The meter electronics 20 receives a vibrational response 210, such as from the meter assembly 10, for example. The meter electronics 20 processes the vibrational response 210 in order to obtain flow characteristics of the flow material flowing through the meter assembly 10. In addition, in the meter electronics 20 according to the invention, the vibrational response 210 is also processed in order to determine a stiffness parameter K of the meter assembly 10. Furthermore, the meter electronics 20 can process two or more such vibrational responses, over time, in order to detect a stiffness change ΔK in the meter assembly 10. The stiffness determination can be made under flow or no-flow conditions. A no-flow determination may offer the benefit of a reduced noise level in the resulting vibrational response.

The interface 201 receives the vibrational response 210 from one of the pickoff sensors 170L and 170R via the leads 100 of FIG. 1. The interface 201 can perform any necessary or desired signal conditioning, such as any manner of formatting, amplification, buffering, etc. Alternatively, some or all of the signal conditioning can be performed in the processing system 203. In addition, the interface 201 can enable communications between the meter electronics 20 and external devices. The interface 201 can be capable of any manner of electronic, optical, or wireless communication.

The interface 201 in one embodiment is coupled with a digitizer (not shown), wherein the sensor signal comprises an analog sensor signal. The digitizer samples and digitizes an analog vibrational response and produces the digital vibrational response 210.

The processing system 203 conducts operations of the meter electronics 20 and processes flow measurements from the flow meter assembly 10. The processing system 203 executes one or more processing routines and thereby processes the flow measurements in order to produce one or more flow characteristics.

The processing system 203 can comprise a general purpose computer, a microprocessing system, a logic circuit, or some other general purpose or customized processing device. The processing system 203 can be distributed among multiple processing devices. The processing system 203 can include any manner of integral or independent electronic storage medium, such as the storage system 204.

The storage system 204 can store flow meter parameters and data, software routines, constant values, and variable values. In one embodiment, the storage system 204 includes routines that are executed by the processing system 203, such as a decay characteristic routine 230 that determines the decay characteristic $\zeta$ of the flow meter 5.

The storage system 204 may stores variables used to operate the flow meter 5. For example, the storage system 204 may store variables such as the vibrational response 210, which can be received from the pickoff sensors 170L and 170R, for example.

In one embodiment, the storage system 204 stores constants, coefficients, and working variables. For example, the storage system 204 can store a determined stiffness characteristic 220. The storage system 204 can also store working values such as a frequency 212 of the vibrational response 210, a response voltage 213 of the vibrational response 210, and a drive current 214.

The storage system 204 can further store a vibrational target 226 and a measured decay characteristic 215 of the flow meter 5. In addition, the storage system 204 can store constants, thresholds, or ranges, such as the tolerance 224. Moreover, the storage system 204 can store data accumulated over a period of time, such as the stiffness change 228.

The decay characteristic routine 230 can configure the processing system 203 to receive a vibrational response from the meter assembly 10. The vibrational response may be received by the interface 201. The vibrational response may comprise a response to an excitation of the meter assembly 10 at a substantially resonant frequency. The delay characteristic routine 230 may also configure the processing system 203 to receive the vibrational response from the interface 201, determine a response voltage V of the vibrational response, determine a decay characteristic $\zeta$ of the meter assembly 10 based on the response voltage V, and compensate the decay characteristic $\zeta$ by using a previously determined decay characteristic-to-response voltage relationship.

Figure 3:
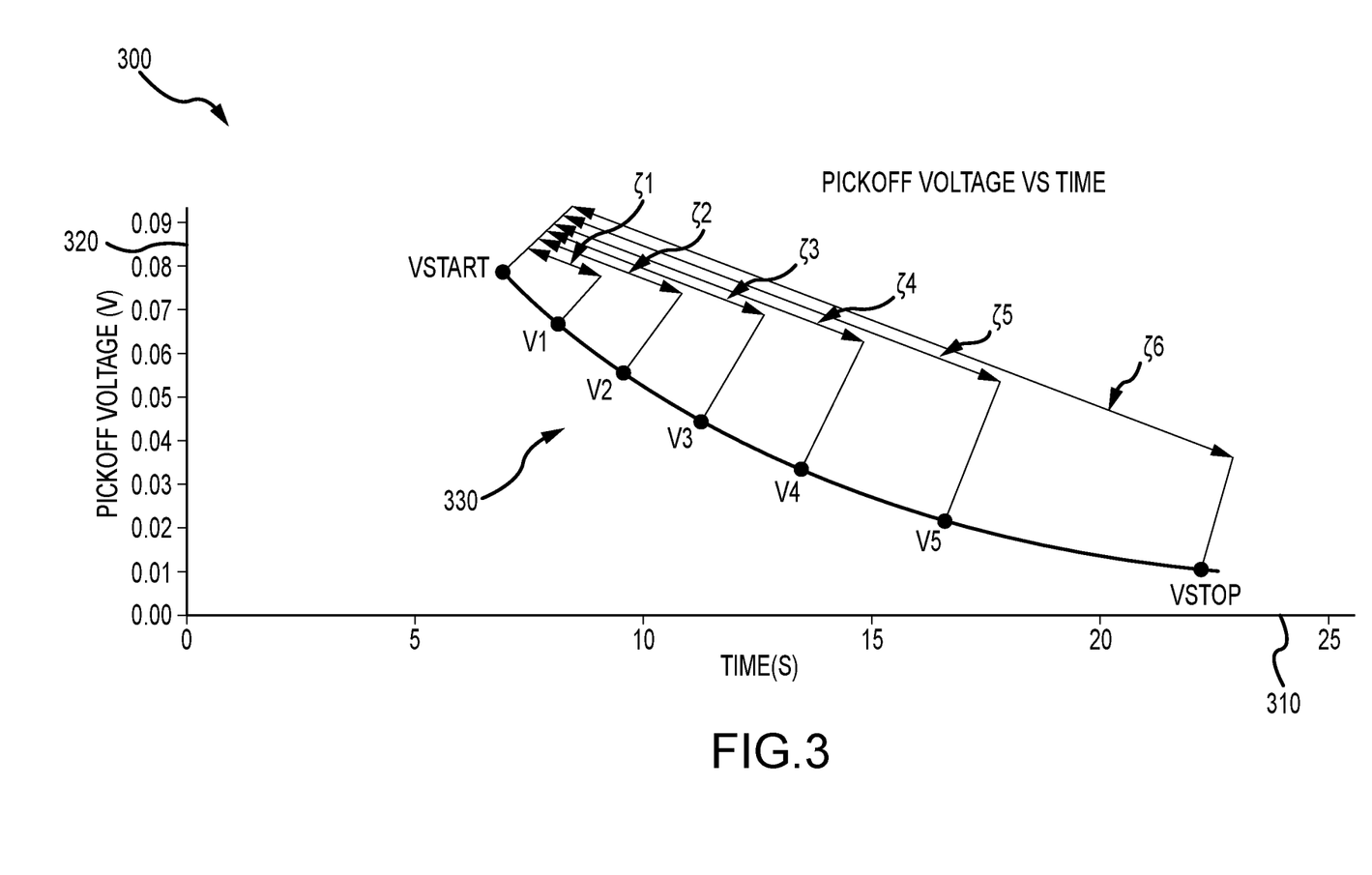
FIG. 3 shows a graph 300 that shows a relationship between a pickoff voltage and time.

FIG. 3 shows a graph 300 that shows a relationship between a pickoff voltage and time. As shown in FIG. 3, the graph 300 includes a time axis 310 and a pickoff voltage axis 320. The time axis 310 is in units of seconds and the pickoff voltage axis 320 is in units of volts. The time axis 310 ranges from about 0 to 25 seconds and the pickoff voltage axis 320 ranges from about 0.00 volts to about 0.09 volts. The graph 300 also includes a response voltage plot 330 that relates response voltages (e.g., pickoff voltages) with time.

The response voltage plot 330 ranges on the time axis 310 from about 7 seconds to about 22 seconds, although any suitable range may be employed. The response voltage plot 330 ranges on the pickoff voltage axis 320 from about 0.01 volts to about 0.08 volts. The response voltage plot 330 includes a start response voltage Vstart and a stop response voltage Vstop. The response voltage plot 330 also includes a first through fifth stop response voltage thresholds V1-V5.

As shown, the first through fifth response voltage thresholds V1-V5 are used relative to the start response voltage Vstart to determine a corresponding fractional decay characteristic. For example, a first fractional decay characteristic $\zeta_1$ corresponds to the response voltage plot 330 ranging from the start response voltage Vstart to the first stop response voltage threshold V1. Similarly, the second through fifth fractional decay characteristic $\zeta_2$-$\zeta_5$ respectively correspond to the second through fifth stop response voltage thresholds V2-V5. Since the first through fifth stop response voltage thresholds V1-V5 are measured relative to the same start response voltage Vstart, the behavior of the decay characteristic $\zeta$ relative to a range of stop response voltage thresholds can be modeled for a given meter assembly, which is discussed in more detail in the following with reference to FIGS. 4 and 5.

Figure 4:
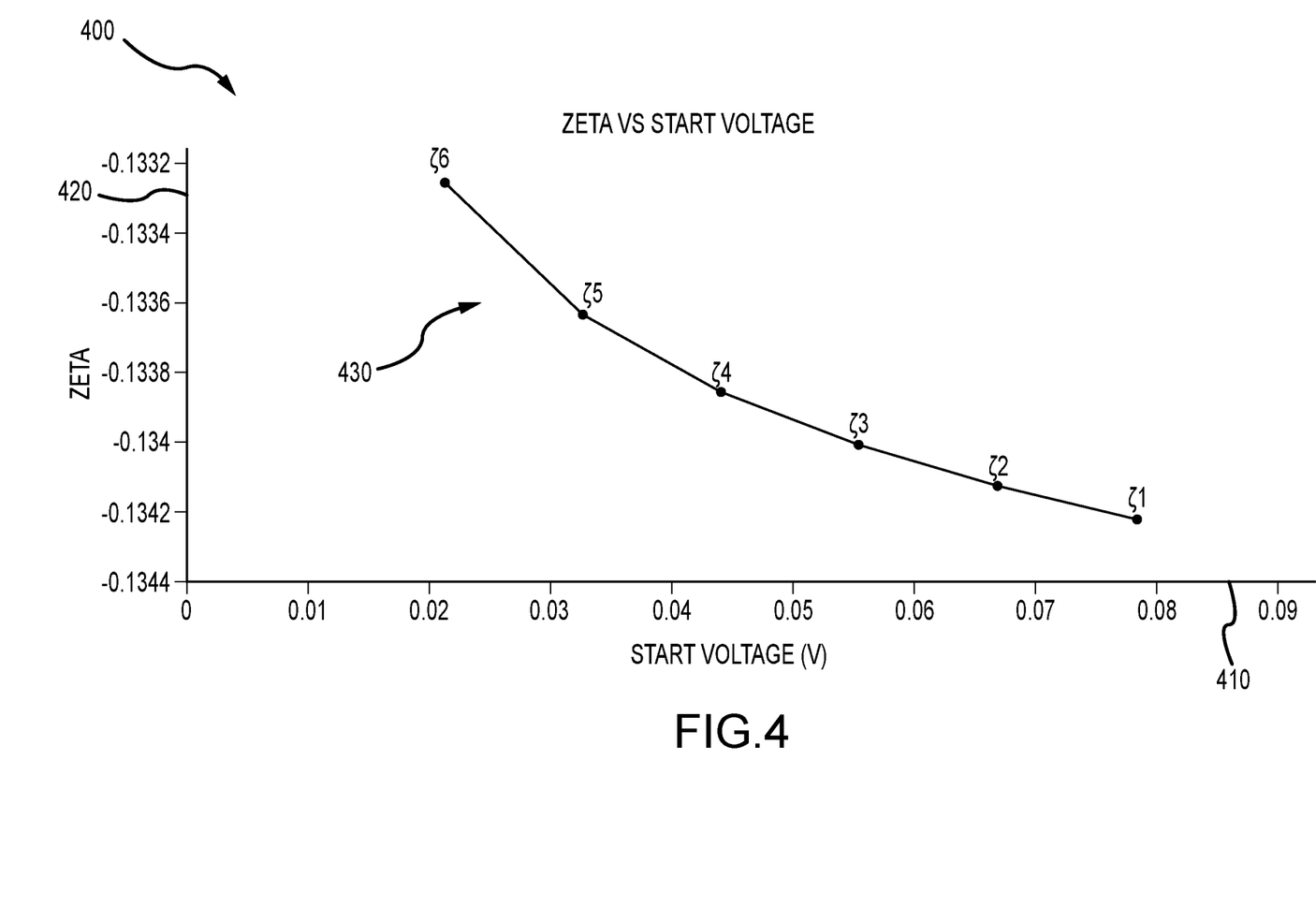
FIG. 4 shows a graph 400 illustrating a relationship between decay characteristics and start response voltage thresholds.

FIG. 4 shows a graph 400 illustrating a relationship between decay characteristics and start response voltage thresholds. As shown in FIG. 4, the graph 400 includes a start voltage axis 410 and a decay characteristic axis 420. The start voltage axis 410 is in units of volts and ranges from 0 to 0.09 volts. The decay characteristic axis 420 is unit-less and ranges from about −0.1344 to −0.1332. The graph 400 also includes a fractional decay-to-start voltage plot 430. As shown, the decay-to-start voltage plot 430 relates fractional decay characteristics to start response threshold voltages.

More specifically, the fractional decay-to-start voltage plot 430 includes a first through sixth fractional decay characteristic $\zeta_1$-$\zeta_6$ corresponding to the first through sixth $\zeta_6$ start response voltage threshold and the start response voltage. The first through fifth fractional decay characteristics $\zeta_1$-$\zeta_5$ are determined at the start response threshold voltages relative to, for example, a common stop response voltage. That is, with reference to FIG. 3, instead of determining the first through sixth fractional decay characteristics at stop response voltage thresholds V1-Vstop, which are measured relative to the start response voltage Vstart, the a first through sixth fractional decay characteristics $\zeta_1$-$\zeta_6$ of FIG. 4 are determined at the first through fifth start response threshold voltage and the start response voltage relative to a common stop response voltage. More specifically, to generate the graph 400 of FIG. 4, the graph 300 of FIG. 3 would be modified such that the first fractional decay characteristic $\zeta_1$ is determined from the start response voltage Vstart to the stop response voltage Vstop and the second fractional decay characteristic $\zeta_2$ is determined from the first response voltage threshold V1 to the stop response voltage Vstop. This pattern is repeated to the sixth fractional decay characteristic $\zeta_6$, which is determined from the fifth response voltage threshold V5 to the stop response voltage Vstop.

As can be seen, the fractional decay-to-start voltage plot 430 decreases as the start response threshold voltage increases. This indicates that the sixth fractional decay characteristic $\zeta_6$ of FIG. 4 determined from, for example, the fifth start response voltage threshold to the stop response voltage is greater than, for example, the first fractional decay characteristic determined from the first start response voltage threshold to the stop response voltage.

Figure 5:
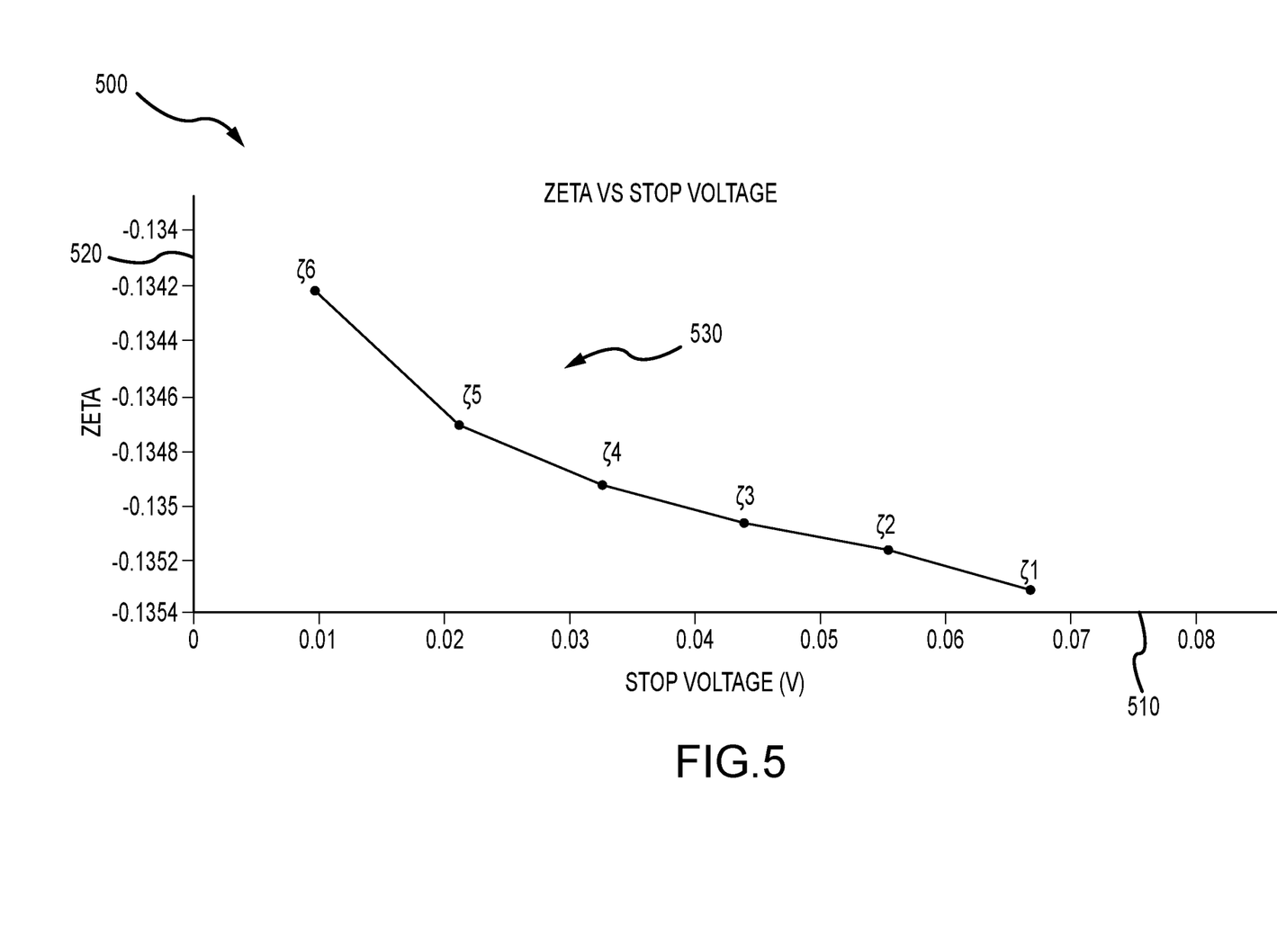
FIG. 5 shows a graph 500 illustrating a relationship between decay characteristics and stop response voltage thresholds.

FIG. 5 shows a graph 500 illustrating a relationship between decay characteristics and stop response voltage thresholds. As shown in FIG. 5, the graph 500 includes a stop voltage axis 510 and a decay characteristic axis 520. The stop voltage axis 510 is in units of volts and ranges from 0 to 0.08 volts. The decay characteristic axis 520 is unit-less and ranges from about −0.1354 to −0.134. The graph 500 also includes a decay-to-stop voltage plot 530. As shown, the decay-to-stop voltage plot 530 relates fractional decay characteristics to stop response threshold voltages.

More specifically, the decay-to-stop voltage plot 530 includes a first through sixth fractional decay characteristics $\zeta_1$-$\zeta_6$ respectively corresponding to the first through fifth stop response voltage thresholds V1-V5 and the stop response voltage Vstop. The first through sixth fractional decay characteristics $\zeta_1$-$\zeta_6$ are determined at the stop response voltage thresholds V1-Vstop relative to, for example, a common start response voltage Vstart. That is, with reference to FIG. 3, the a first through sixth fractional decay characteristics $\zeta_1$-$\zeta_6$ of FIG. 5 are determined at stop response threshold voltages relative to a common start response voltage Vstart.

As can be seen, the decay-to-stop voltage plot 530 decreases as the start response threshold voltage increases. This indicates that the fifth fractional decay characteristic $\zeta_5$ of FIG. 5 determined from, for example, the start response voltage Vstart to the fifth stop response voltage threshold V5 of FIG. 3 is greater than, for example, the first fractional decay characteristic $\zeta_1$ determined from the start response voltage Vstart to the first stop response voltage threshold V1 shown in FIG. 3.

Figure 6:
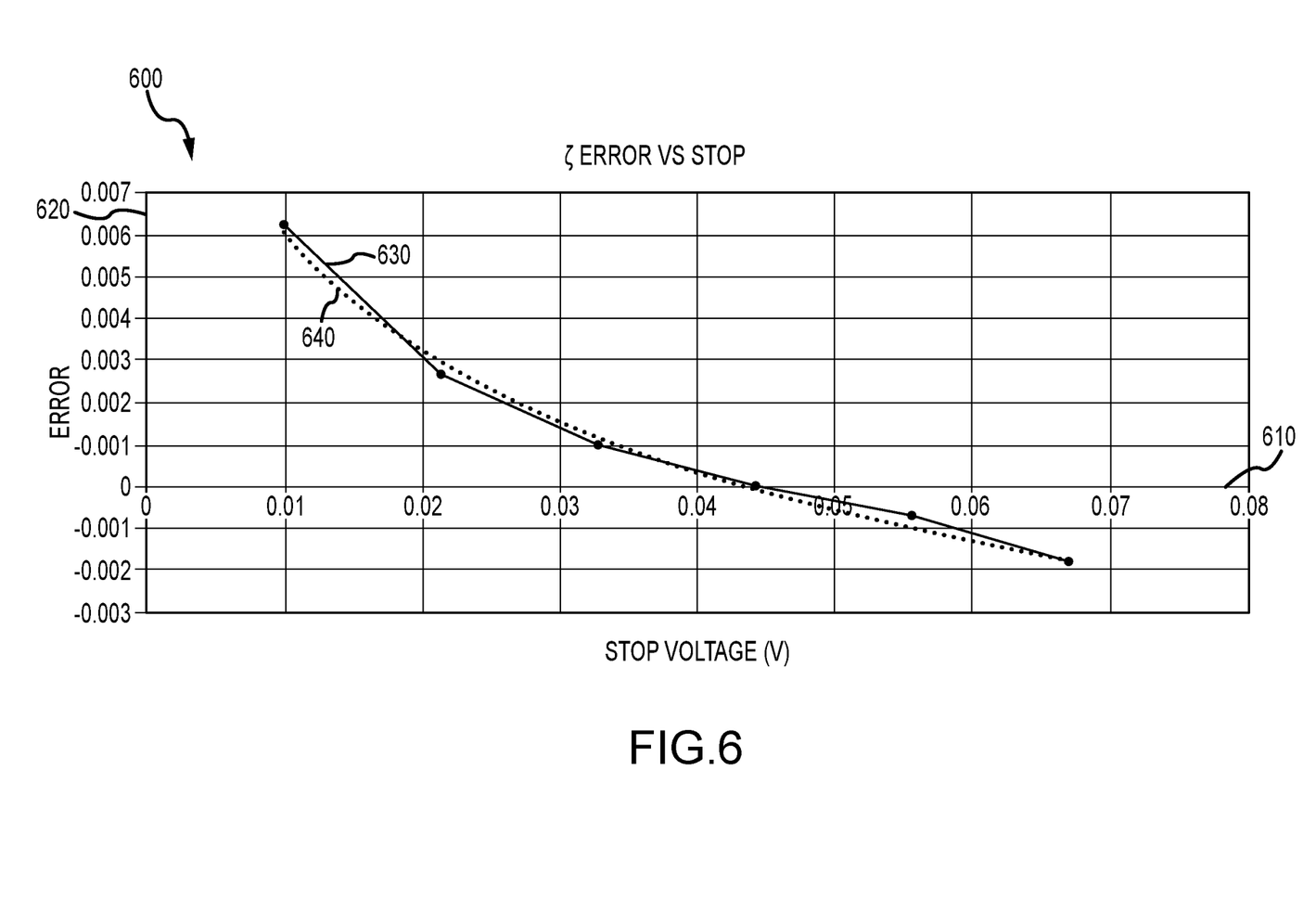
FIG. 6 shows a graph 600 showing a relationship between decay characteristic errors and stop response voltages.

FIG. 6 shows a graph 600 showing a relationship between decay characteristic errors and stop response voltages. As shown in FIG. 6, the graph 600 includes a stop response voltage axis 610 and a decay characteristic error axis 620. The stop response voltage axis 610 is in units of volts and the decay characteristic error axis 620 is unit-less. The stop response voltage axis 610 ranges from 0 to 0.08 volts and the decay characteristic error axis 620 ranges from −0.003 to 0.007, although any suitable range may be employed. The graph 600 also includes an error-to-response voltage plot 630 that decreases from an error of about 0.0061 to about −0.0018 over the response voltage range of 0.01 volts to 0.067 volts. Also shown is an error-to-response voltage function 640 that ranges from about 0.006 to about −0.0018.

The error-to-response voltage plot 630 is comprised of a plurality of errors determined as a difference between the third fractional decay characteristic at the third stop response voltage V3 relative to the start response voltage Vstart shown in FIG. 5. As a result, the error-to-response voltage plot 630 looks similar to the decay-to-stop voltage plot 530 shown in FIG. 5. However, the error-to-response voltage plot 630 crosses the stop response voltage axis 630 at the third stop response voltage V3 value where there is no error. Other error-to-response voltage plots may cross a stop response voltage axis at other values and not necessarily the third stop response voltage V3 value.

The error-to-response voltage function 640 is shown as a dotted line that is, generally speaking, proximate the error-to-response voltage plot 630. The error-to-response voltage function 640 is generated by curve fitting to the error-to-response voltage plot 630. For example, the curve fit to the error-to-response voltage plot 630 may result in the formula, $y = -0.00409229 \cdot \ln(x) - 0.01281067$, which is the error-to-response voltage function 640 shown in FIG. 3. The error-to-response voltage function 640 may have an R-squared value of 0.99485913 when compared to the error-to-response voltage plot 630. This may indicate that the error-to-response voltage plot 630 is close to the error-to-response voltage function 640.

As can be appreciated, the error-to-response voltage function 640 may advantageously be a relatively simple equation in the form of:

$$y = m \cdot \ln(x), \quad (13)$$

that can be used in code to calculate a new decay coefficient given a start or stop response voltage, where:

x is the start or stop response voltage;

m is the decay characteristic compensation coefficient resulting from the curve fit; and y is an error.

The above equation (13) may be used to compensate a decay characteristic according to the following equation (14):

$$\zeta_{comp} = \zeta_{raw} \cdot (1+y); \quad (14)$$

where:

$\zeta_{comp}$ is a compensated decay characteristic;

$\zeta_{raw}$ is an uncompensated decay characteristic determined from measuring the response voltage; and y is an error calculated using above equation (13).

Accordingly, a decay characteristic $\zeta$ may be compensated by a previously determined decay characteristic-to-response voltage relationship. For example, the error-to-response voltage function 640 may be the previously determined decay characteristic-to-response voltage relationship. As can be appreciated, although the foregoing describes a decay characteristic as being compensated by the error-to-response voltage function 640 as expressed in the form of equation (13), any suitable decay characteristic-to-response voltage relationship may be employed.

Figure 7:
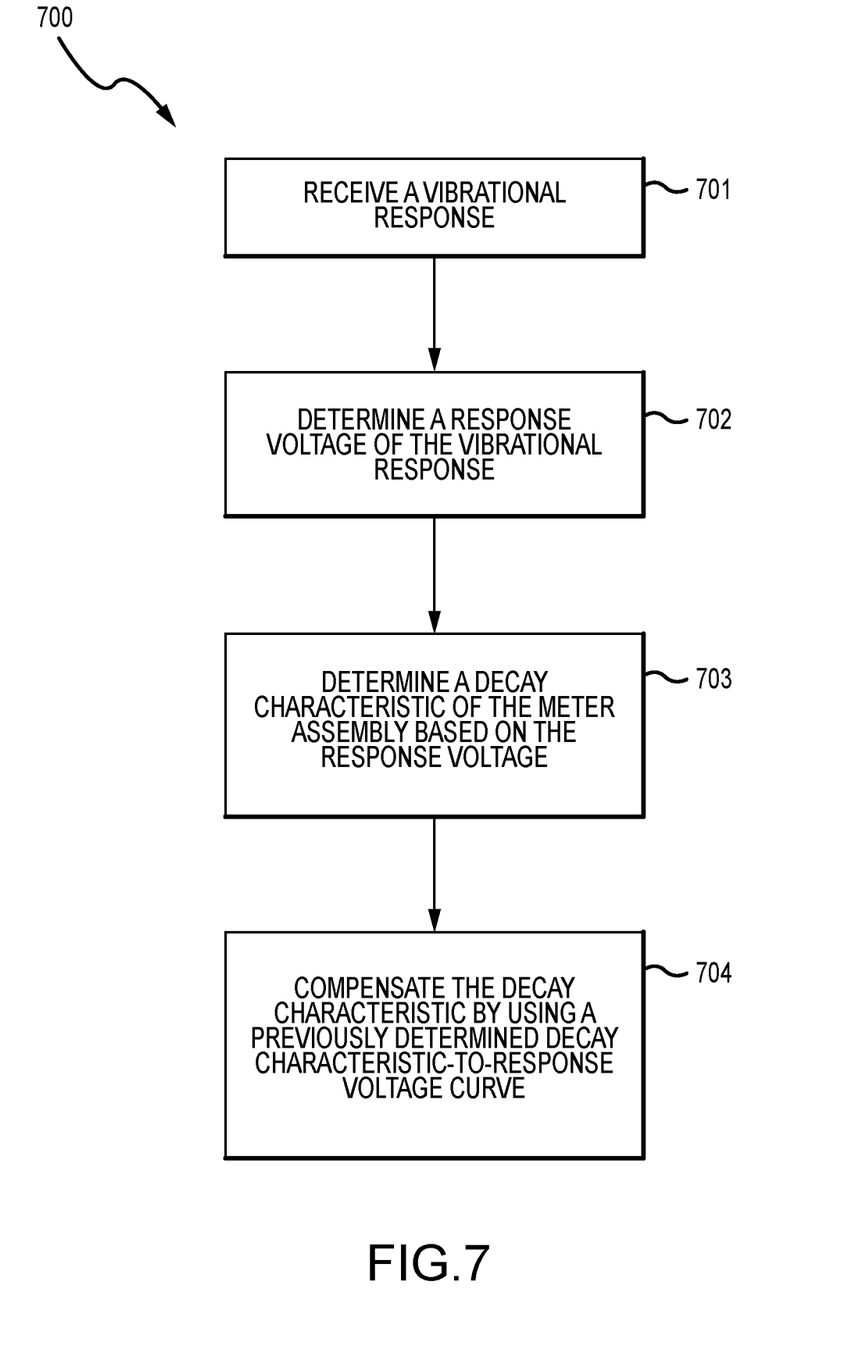
FIG. 7 shows a method 700 for determining a decay characteristic of a meter assembly, such as the meter assembly 10 described with reference to FIG. 1.

FIG. 7 shows a method 700 for determining a decay characteristic $\zeta$ of a meter assembly, such as the meter assembly 10 described with reference to FIG. 1. In step 701, a vibrational response is received from the meter assembly. The vibrational response is a response of the meter assembly to a vibration at a substantially resonant frequency. The vibration can be continuous or intermittent. A flow material can be flowing through the meter assembly 10 or can be static.

In step 702, a response voltage of the vibrational response is determined. The response voltage can be determined from the vibrational response by any method, process, and/or hardware. The response voltage may be a start response voltage, a stop response voltage, and/or any voltage between the start response voltage and the stop response voltage. The response voltage may be determined by measuring the response voltage as the vibrational response decays from a start response voltage threshold to a stop response voltage threshold.

In step 703, a decay characteristic of the meter assembly is determined based on the response voltage. The decay characteristic can be determined by allowing the vibrational response of the flow meter to decay down to a vibrational target, such as a stop response voltage threshold. This decaying action can be performed in several ways. The drive signal amplitude can be reduced, the driver 180 can actually perform braking of the meter assembly 10 (in appropriate flow meters), or the driver 180 can be merely unpowered until the target is reached. In one embodiment, the vibrational target comprises a reduced level in a drive setpoint. For example, if the drive setpoint is currently at 3.4 mV/Hz, then for the damping measurement the drive setpoint can be reduced to a lower value, such as 2.5 mV/Hz, for example. In this manner, the meter electronics 20 can let the meter assembly 10 simply coast until the vibrational response substantially matches this new drive target.

In step 704, the decay characteristic is compensated by using a previously determined decay characteristic-to-response voltage relationship. For example, where the response voltage of step 703 is equal to the start response voltage threshold and the stop response voltage threshold is zero volts, then the decay characteristic-to-response curve may be used to determine a previously determined decay characteristic $\zeta$ that corresponds to such a response voltage range. That is, this value can be used to compensate the decay characteristic value to a corrected decay characteristic value that would correspond to a full range of response voltage values, although any suitable range may be employed.

The method 700 can be iteratively, periodically, or randomly performed. The method 700 can be performed at predetermined landmarks, such as at a predetermined hours of operation, upon a change in flow material, etc.

Figure 8:
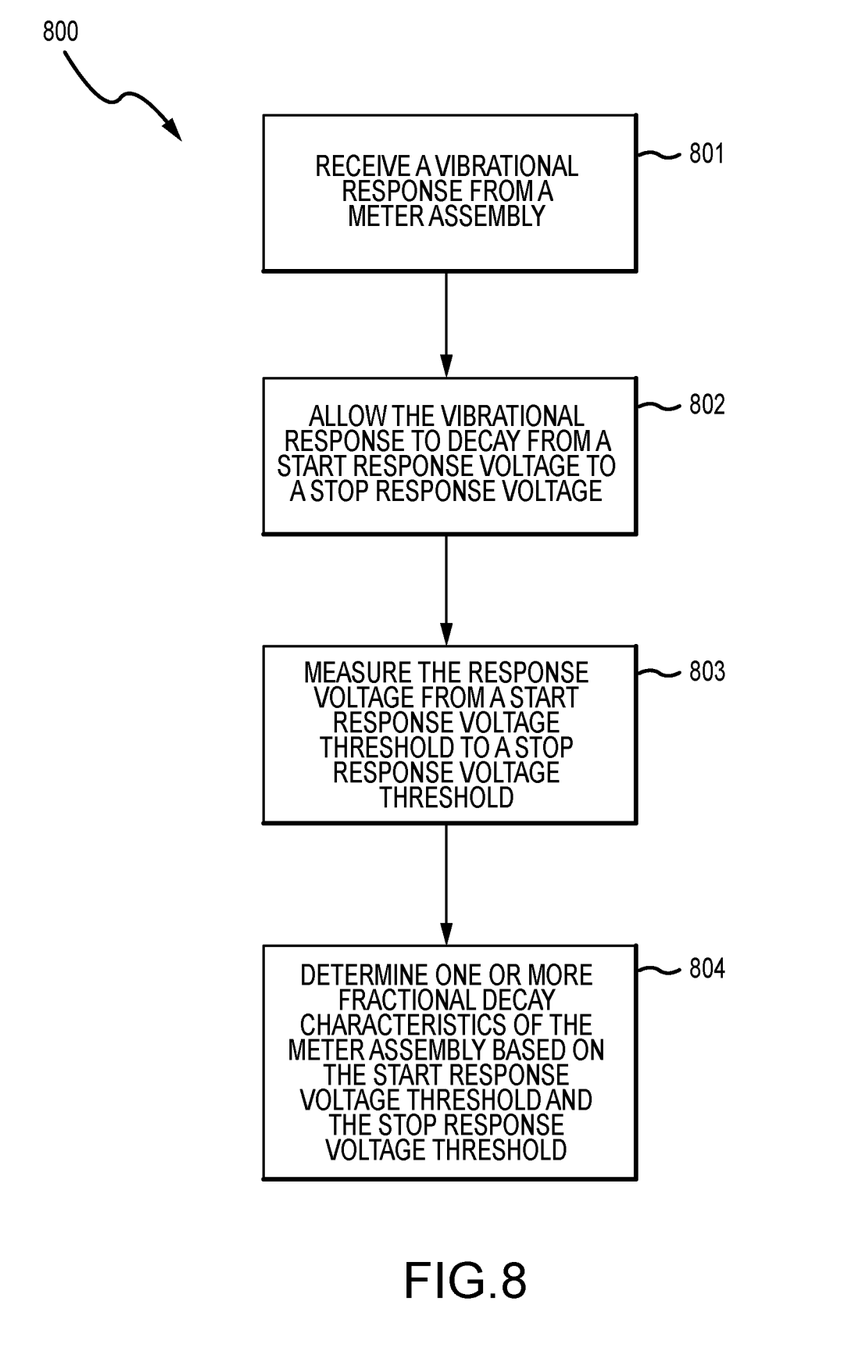
FIG. 8 shows a method 800 for determining a decay characteristic of a meter assembly, such as the meter assembly 10 described with reference to FIG. 1.

FIG. 8 shows a method 800 for determining a decay characteristic $\zeta$ of a meter assembly, such as the meter assembly 10 described with reference to FIG. 1. In step 801, a vibrational response is received from a meter assembly, such as the meter assembly 10 described above with reference to FIG. 1. The vibrational response may be received by a meter electronics, such as the meter electronics 20 described above with reference to FIG. 2.

In step 802, the vibrational response is allowed to decay from a start response voltage to a stop response voltage. This decay may be performed in a manner similar to that described above with reference to FIG. 7. The start response voltage may be a response voltage of the response to a vibration of the meter assembly at a substantially resonant frequency and the stop response voltage may be proximate zero volts.

In step 803, the response voltage is measured from a start response voltage threshold to a stop response voltage threshold. The response voltage may additionally be measured from additional start response voltage thresholds and/or additional stop response voltage thresholds. The start response voltage threshold may be proximate the start response voltage and/or the stop response voltage threshold may be proximate the stop response voltage. For example, the stop response voltage threshold may be proximate zero volts where the stop response voltage is zero volts. Additionally or alternatively, the start response voltage threshold may not be proximate the start response voltage and/or the stop response voltage threshold may not be proximate the stop response voltage.

In step 804, one or more fractional decay characteristics of the meter assembly are determined. The one or more fractional decay characteristics may be determined based on one of the start response voltage threshold and the stop response voltage threshold. At least one of the start response voltage threshold and the stop response voltage threshold may be between the start response voltage and the stop response voltage. That is, if the stop response voltage is zero volts, the stop response voltage threshold may be, for example, at 0.2 volts. As a result, the response voltage between 0.2 to zero volts may not be measured for determining a decay characteristic $\zeta$.

Determining the one or more fractional decay characteristics of the meter assembly based on the start response voltage threshold and the stop response voltage threshold may be comprised of determining one or more fractional decay characteristics of the meter assembly based on one or more stop response voltage thresholds relative to a start response voltage threshold or determining one or more fractional decay characteristics of the meter assembly based on one or more start response voltage thresholds relative to a stop response voltage threshold. Any suitable combination of the foregoing can be used.

The foregoing describes the meter electronics 20 and the methods 700 and 800 that can determine a decay characteristic of the meter assembly 10. The decay characteristic of the meter assembly 10 can be determined by compensating a decay characteristic measured from, for example, the start response voltage to a stop response voltage threshold that doesn't include an entire decay. For example, the stop response voltage threshold may be greater than zero volts and therefore, the decay characteristic of the meter assembly 10 is determined based on a partially decayed vibration. As a result, the decay characteristic cannot be used in comparison to a decay characteristic of the meter assembly 10 determined based on a full decay of a vibration of the meter assembly 10.

This technical solution of determining the decay characteristic is directed to the technical problem of decay characteristics that are determined based on only part of a decay of a vibration. Due to the decay characteristic being determined based on only a part of the decay, the decay characteristic may not be used to determine, for example, a stiffness that can be compared to a previously determined stiffness. Therefore, a change in the stiffness may not be accurately determined. By compensating the decay characteristic, a stiffness may be accurately compared to a previously determined stiffness.

Accordingly, a technical solution of determining a decay characteristic of a meter assembly by, among other things, compensating a decay characteristic $\zeta$ by using a previously determined decay characteristic-to-response voltage relationship allows the compensated decay characteristic to more accurately detect a change in the meter assembly 10 described above, or other meter assemblies. Accordingly, the technology of meter verification is improved because the change in the meter assembly is accurately detected thereby allowing, for example, more accurate flow rate measurements.

The detailed descriptions of the above embodiments are not exhaustive descriptions of all embodiments contemplated by the inventors to be within the scope of the present description. Indeed, persons skilled in the art will recognize that certain elements of the above-described embodiments may variously be combined or eliminated to create further embodiments, and such further embodiments fall within the scope and teachings of the present description. It will also be apparent to those of ordinary skill in the art that the above-described embodiments may be combined in whole or in part to create additional embodiments within the scope and teachings of the present description.

Thus, although specific embodiments are described herein for illustrative purposes, various equivalent modifications are possible within the scope of the present description, as those skilled in the relevant art will recognize. The teachings provided herein can be applied to other electronics and methods that determine a decay characteristic of meter assembly and not just to the embodiments described above and shown in the accompanying figures. Accordingly, the scope of the embodiments described above should be determined from the following claims.

We claim:

1. A meter electronics (20) for determining a decay characteristic of a meter assembly (10) of a flow meter (5), the meter electronics (20) comprising an interface (201) for receiving a vibrational response from a meter assembly (10), the vibrational response comprising a response to an excitation of the meter assembly (10) at a substantially resonant frequency, and a processing system (203) in communication with the interface (201), the processing system (203) being configured to:

receive the vibrational response from the interface (201);

determine a response voltage (V) of the vibrational response;

determine a decay characteristic ($\zeta$) of the meter assembly (10) based on the response voltage (V); and compensate the decay characteristic ($\zeta$) by using a previously determined decay characteristic-to-response voltage relationship.

2. The meter electronics (20) of claim 1, wherein the previously determined decay characteristic-to-response voltage relationship includes one of a start response voltage and a stop response voltage used to determine the decay characteristic ($\zeta$).

3. The meter electronics (20) of claim 1, wherein the previously determined decay characteristic-to-response voltage relationship relates a previously determined decay characteristic with one of a start response voltage and a stop response voltage.

4. The meter electronics (20) of claim 1, wherein the previously determined decay characteristics-to-response voltage relationship is an error-to-response voltage function.

5. The meter electronics (20) of claim 1, wherein determining the decay characteristic ($\zeta$) further comprises allowing the response voltage (V) of the vibrational response of the meter assembly (10) to decay down to a predetermined stop response voltage.

6. The meter electronics (20) of claim 1, with the processing system (203) being further configured to determine the decay characteristic ($\zeta$) by removing the excitation of the meter assembly (10) and allowing the response voltage (V) of the vibrational response of the meter assembly (10) to decay down to a predetermined stop response voltage.

7. A method for determining a decay characteristic of a meter assembly of a flow meter, the method comprising receiving a vibrational response from the meter assembly, the vibrational response comprising a response to an excitation of the meter assembly at a substantially resonant frequency, with the method further comprising:

receiving the vibrational response;

determining a response voltage of the vibrational response;

determining a decay characteristic of the meter assembly based on the response voltage; and compensating the decay characteristic by using a previously determined decay characteristic-to-response voltage relationship.

8. The method of claim 7, wherein the previously determined decay characteristic-to-response voltage relationship includes one of a start response voltage and a stop response voltage used to determine the decay characteristic.

9. The method of claim 7, wherein the previously determined decay characteristic-to-response voltage relationship relates a previously determined decay characteristic with one of start response voltage and stop response voltage.

10. The method of claim 7, wherein the previously determined decay characteristics-to-response voltage relationship is an error-to-response voltage function.

11. The method of claim 7, wherein determining the decay characteristic further comprises allowing the response voltage of the vibrational response of the meter assembly to decay down to a predetermined stop response voltage.

12. The method of claim 7, wherein the decay characteristic is determined by removing the excitation of the meter assembly and allowing the response voltage of the vibrational response of the meter assembly to decay down to a predetermined stop response voltage.

13. A method of determining a decay characteristic of a meter assembly of a flow meter, the method comprising receiving a vibrational response from the meter assembly, the vibrational response comprising a response to an excitation of the meter assembly at a substantially resonant frequency, with the method further comprising:
   receiving the vibrational response from the interface;
   allowing the vibrational response to decay from a start response voltage to a stop response voltage;
   measuring the response voltage from a start response voltage threshold to a stop response voltage threshold; and
   determining one or more fractional decay characteristics of the meter assembly based on the start response voltage threshold and the stop response voltage threshold, wherein at least one of the start response voltage threshold and the stop response voltage threshold is between the start response voltage and the stop response voltage.

14. The method of claim 13, wherein the start response voltage is a response voltage of the response to the vibration of the meter assembly at the substantially resonant frequency and the stop response voltage is proximate zero volts.

15. The method of claim 13, wherein one of the start response voltage threshold is proximate the start response voltage and the stop response voltage threshold is proximate the stop response voltage.

16. The method of claim 13, wherein determining the one or more fractional decay characteristics of the meter assembly based on the start response voltage threshold and the stop response voltage threshold, wherein at least one of the start response voltage threshold and the stop response voltage threshold is between the start response voltage and the stop response voltage comprises one of:
   determining one or more fractional decay characteristics of the meter assembly based on one or more stop response voltage thresholds relative to a start response voltage threshold; and
   determining the one or more fractional decay characteristics of the meter assembly based on one or more start response voltage thresholds relative to a stop response voltage threshold.

17. The method of claim 13, further comprising determining a decay characteristic-to-response voltage relationship for compensating a decay characteristic that is based on the start response voltage threshold and the stop response voltage threshold.

18. The method of claim 13, wherein the start response voltage threshold is determined based on the start response voltage.

* * * * *